United States Patent [19]

Boldwyn

[11] Patent Number: 4,965,492

[45] Date of Patent: Oct. 23, 1990

[54] LIGHTING CONTROL SYSTEM AND MODULE

[75] Inventor: Scott L. Boldwyn, McHenry, Ill.

[73] Assignee: Energy Technology, Inc., Hofman Estates, Ill.

[21] Appl. No.: 273,055

[22] Filed: Nov. 18, 1988

[51] Int. Cl.[5] .................... H05B 37/02; H05B 39/02; G05F 1/00; G01J 1/20

[52] U.S. Cl. .................................. 315/156; 315/291; 315/297; 315/DIG. 4; 315/DIG. 5; 315/308; 250/205

[58] Field of Search ................ 315/297, 291, DIG. 4, 315/DIG. 5, 308, 227 R, 156; 250/205

[56] References Cited

U.S. PATENT DOCUMENTS

| | | | |
|---|---|---|---|
| 242,897 | 6/1881 | Edison | 315/291 |
| 3,002,099 | 9/1961 | Gregory, Jr. et al. | 250/205 |
| 3,051,859 | 8/1962 | Richards | 315/156 |
| 3,170,085 | 2/1965 | Genuit | 315/227 R |
| 3,360,650 | 12/1967 | Lawrence | 250/205 |
| 3,599,037 | 8/1971 | Grace | 250/205 |
| 4,292,570 | 9/1981 | Engel | 315/156 |
| 4,390,814 | 6/1983 | Peck | 315/320 |
| 4,568,857 | 2/1986 | Head | 315/DIG. 4 |
| 4,697,122 | 9/1987 | Hoffer | 315/156 |
| 4,733,138 | 3/1988 | Pearlman et al. | 315/293 |
| 4,749,917 | 6/1988 | Angott et al. | 315/DIG. 4 |
| 4,804,916 | 2/1989 | Frank | 315/307 |

*Primary Examiner*—Eugene R. LaRoche
*Assistant Examiner*—Michael B. Shingleton
*Attorney, Agent, or Firm*—Robert E. Browne; Thomas C. McDonough

[57] ABSTRACT

A micro processor based Lighting Control System and Module is disclosed which controls lighting circuits to operate at reduced power levels to obtain the most efficient lighting level for a given task to obtain conservation of energy and a financial savings. After the control is set by the user for a selected lighting level reduction, a selected power is applied; and, the system, through its micro processor and control circuitry, continuously monitors the power applied, and maintains a desired power level to maintain the lighting level desired.

4 Claims, 4 Drawing Sheets

LIGHTING CONTROL SYSTEM AND MODULE

BACKGROUND OF INVENTION

Lighting comprises thirty to sixty percent of the total electrical energy use in buildings and industry. Lighting controls are therefore important for conserving energy as well as for fiscal reasons. Most of the products offered in todays market to provide lighting control rely on On/Off type control products; and, on the use of dimming controls that lower the light and power levels. Many of these products cause flickering of the lights, and cause lamp and ballast noise. Also, lighting control products which are presently available require constant need for calibration because of drift due to changing voltages, and because of aging of the lamp circuits. Many of those products in the present market place that do work satisfactorily are expensive and costly to install. Other such products are expensive to install since in order to install such products the existing ballast must be removed which adds to the total installation cost. The pay back for installation of these prior art products just does not meet fiscal requirements.

SUMMARY OF INVENTION

The inventive lighting controller system controls lighting circuits to operate at reduced power levels for a resultant conservation of energy and a financial savings.

The inventive system comprises a modular solid state microprocessor based system that is configured to perform a power usage reduction for various types of lighting such as fluorescent lights and for high intensity discharge lamps.

The inventive system is installed to be programmed to control the power levels for each circuit to perform the tasks required in that particular area; that is, the inventive system "tunes" the power, and that function is used to implement light control for tasks to be accomplished in the designated area. For example, lamp circuits are "tuned" for a lower light level above aisles, hallways and less visually critical work spaces. Where close visual tasks are performed, power levels are "tuned" higher, i.e., increased.

DRAWINGS

The foregoing features and advantages of the present invention will be apparent from the following more particular description of the invention. The accompanying drawings, listed hereinbelow, are useful in explaining the invention.

FIG. 1 is a block diagram depicting an installation of the inventive lighting control system and module;

FIGS. 2 and 2A comprise a block diagram of the inventive actuator control module;

FIG. 3-3*e* are diagrams of a waveform and measurement points therein useful in explaining an important concept of the invention;

DESCRIPTION OF THE INVENTION

Surveys by the Illuminating Engineering Society show that most buildings are over illuminated. The society has reevaluated the levels necessary to perform different tasks as shown in Table 1, and have recommended that light levels be generally lowered.

TABLE 1

| | Foot Candles |
|---|---|
| Reading, Writing, and Typing | 50 to 70 |
| Accounting Areas, Draft Boards | 70 to 100 |
| CRT Screens | 30 to 50 |
| Work Station, Nontask Areas | 25 to 30 |
| Corridor or Circulation Areas | 10 to 20 |
| Conference Rooms, Nontask Areas | 25 to 30 |

Thus, the lighting control strategy of the invention should again be emphasized. The present invention provides a method of "tuning", that is, adjusting the light level of the light fixtures for specific application from a maximum or full level to a lower level.

Figure 1:
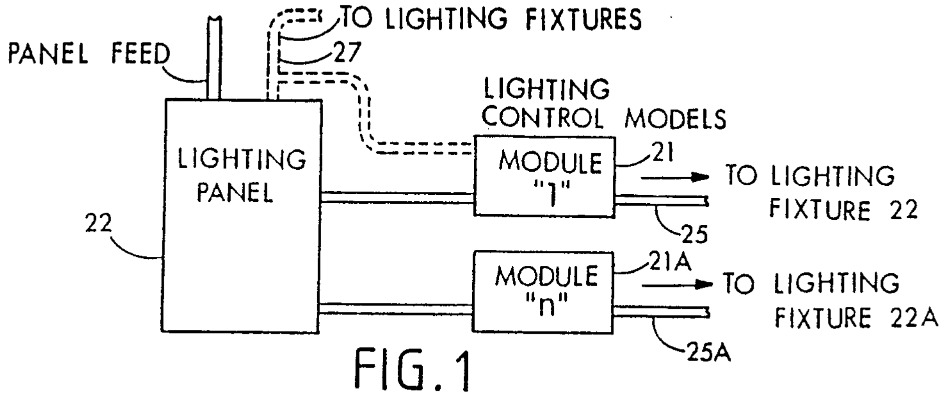

FIG. 1 depicts the mounting of the inventive actuator module 21 of the inventive system. Multiple modules 21 (1−n) may be mounted in one installation to control particular areas in a given building. The actuator module 21 is effectively coupled electrically in series between the lighting input panel 22 and the fixtures of lighting. If a module 21 is provided for a new installation, the conduits and wiring 25 can be installed to connect to the light fixture. Actuator module "n" labeled 21A an be connected through conduits and wiring 25A to the respective light fixtures. If it is an established installation, the module 21 can effectively be mounted to be retrofitted or "cut-into" the existing electrical conduits 27, as indicated by the dotted lines of FIG. 1.

Importantly, the actuator model 21 samples the current being drawn by the light fixtures and effectively measures and controls the power to the light fixtures, as will be explained. The module 21 can thus provide control essentially independent of light load characteristics and of the line phase and can thus efficiently control fluorescent lights or high intensity lights.

The module 21 can control one 20 amp, single phase 120 volt, 208 volt, 240 volt, or 277 volt lighting circuit of standard high power factor fluorescent ballast or energy savings type fluorescent ballast (non-electronic type), and slim line fluorescent ballasts. Importantly, the module 21 is also capable of operating high intensity discharge (HID) lamps and ballast such as high pressure sodium, mercury, and metal halide of approved ballast types.

Each module 21 when set at 120 volts can tune up to six 250 watt or 1.92 kilowatts HID type lamps and ballast of the recommended type. When set at 277 volts the module 21 can tune a maximum of 4430 watts (4.43 kilowatts); for example, 90 rapid start fluorescent lamps (20–4 lamp fixtures). The maximum loading per module 21 is 16 amps per 20 amp lighting circuit.

Figure 2:
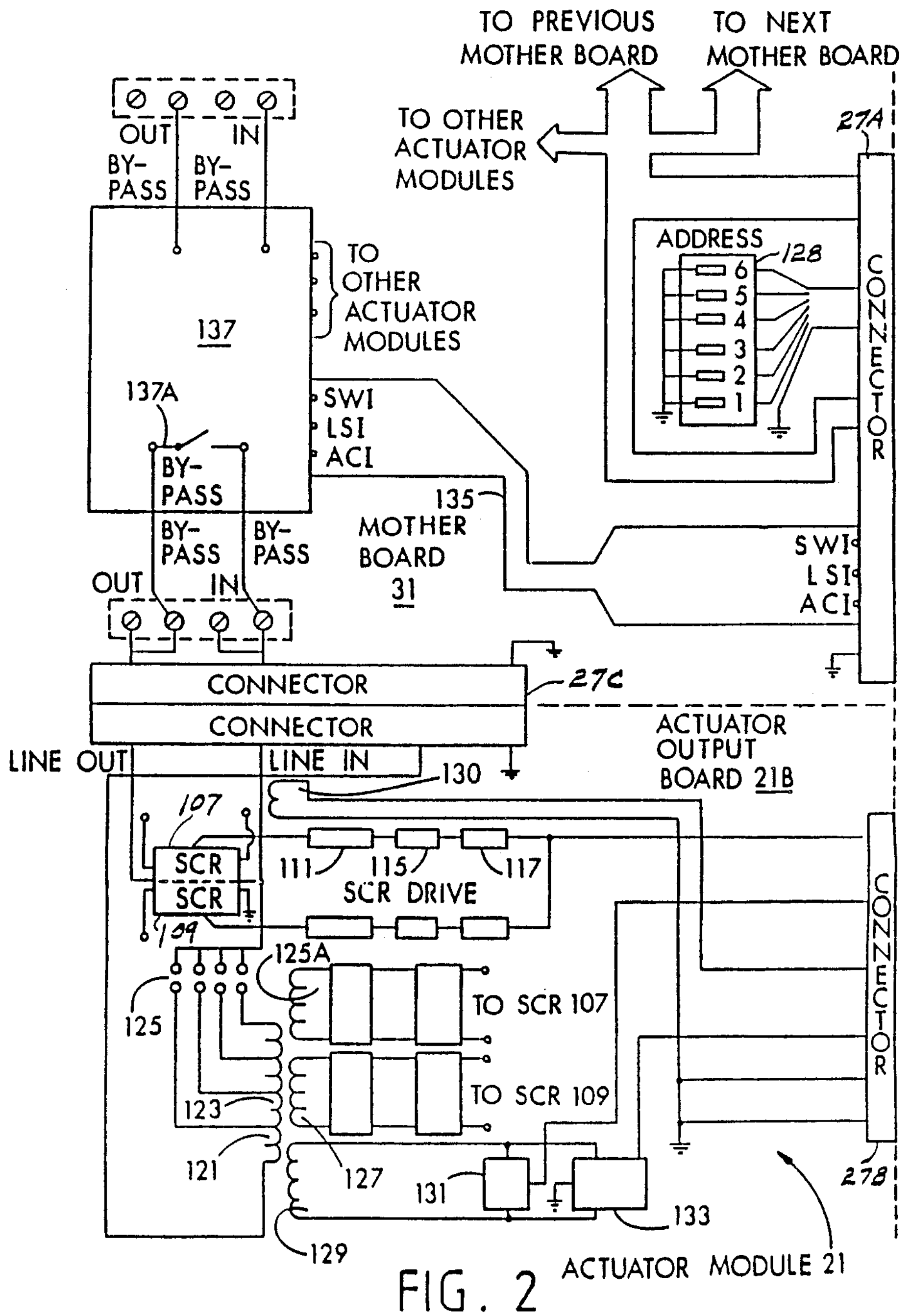
Figure 2A:
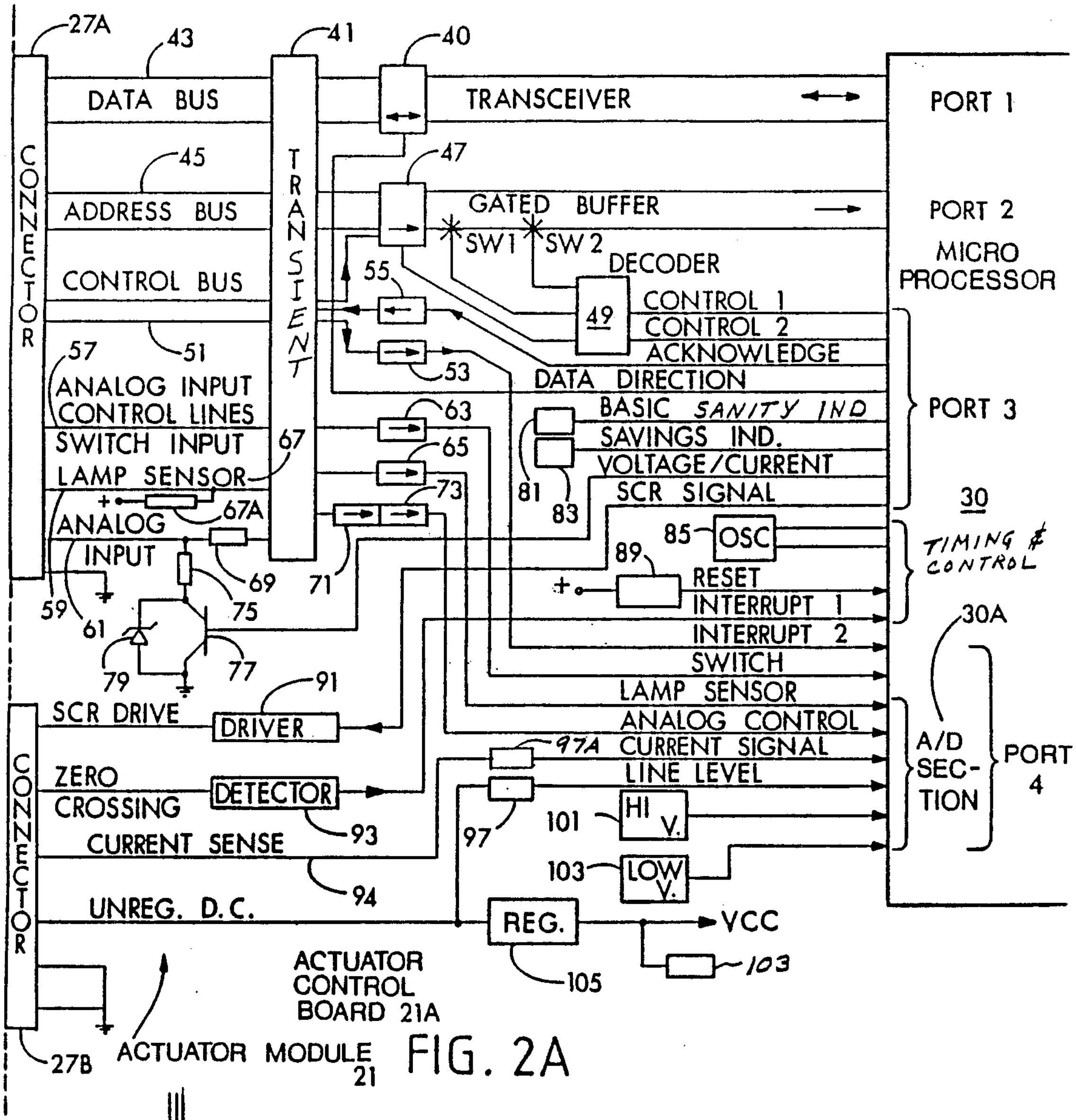

Refer now to FIGS. 2 and 2A which show a block diagram of the inventive lighting fixture control module 21. Module 21 comprises an actuator control board 21A and an actuator output board 21B. The actuator control board 21A (FIG. 2A) is connected to a mother board 31 through a suitable connector 27A. The actuator control board 21A also connects through a suitable connecter 27B to the actuator output board 21B. The actuator output board 21B connects to the mother board 31 through a suitable connecter 27C, all as shown in FIG. 2 and 2A.

Actuator control board 21A includes a microprocessor 30 of any suitable known type, and which in the embodiment shown it is a Motorola 6870523 type microprocessor. Microprocessor 30 includes various communication ports as shown in FIG. 2. Port 1 of microprocessor 30 couples to a tranceiver 40 which in turn couples through a transient suppression circuit 41 to a data bus 43. The data bus 43 is connected as indicated in FIG. 2 and 2A through connector 27A to other actuator modules and to the previous and succeeding mother boards.

An address bus 45 connects from connector 27A through transient suppression circuit 41, a gated buffer 47 and switches SW1 and SW2 to port 2 of microprocessor 30. The gated buffer 47 also connects through a decoder 49 to provide control 1 and control 2 signals, as will be explained.

A control bus 51 connects through transient suppression circuit 41 to couple a parity signal to the gated buffer 47; and also to couple a signal labeled interrupt 2 through a buffer 53 to port 4 of microprocessor 4. Port 4 of microprocessor 30 also includes an analog to digital convertor section 30A. The control bus 51 receives an acknowledge signal through a buffer 55 from port 3 of microprocessor 30.

Analog input control signals are connected through lines 57, 59, and 61 from connector 27A through transient suppression circuit 41 to port 4 of microprocessor 30. A switch input signal is connected through lines 57, suppression circuit 41 and buffer 63 to port 4 of microprocessor 30. A lamp sensor signal 67 is developed across precision resistor 67A and is coupled via line 59 through filter 65 to port 4 of microprocessor 30. A precision resistor 67 is connected from a D.C. potential source to line 59.

The actuator control board 21A receives an analog input through line 61. Control board 21A is adapted to monitor a set of terminals connecting to an analog control supplied such as by a building energy management system when such a system is provided. The analog input control signal is connected in series through precision resistor 69, through transient suppression circuit 41 to a divider 71 and a filter 73 and thence to port 4 of microprocessor 30.

The analog input line 61 is also connected through precision resistor 75 to the collector of an transistor 77 which has its emitter connected to ground. A zener diode 79 is connected in parallel with transistor 77 to provide over voltage protection for the analog input. The base of transistor 77 receives a control signal from the microprocessor 30. When transistor 77 is ON the analog input is conditioned to receive a 4–20 ma current signal. When transistor 77 is OFF the analog input is conditioned to receive a 0–10 volt signal.

Port 3 of microprocessor 30 provides a data direction control signal to tranceiver 40, a savings indicator signal to indicator 83, and a basic status indicator signal to indicator 81.

A crystal oscillator 85 provides the timing input to microprocessor 30. A power up reset circuit 89 provides noise protection and reset control to microprocessor 30.

Refer now to connector 27B (lower portion of FIG. 2A) and also to actuator output board 21B (FIG. 2). An SCR drive control signal is provided by microprocessor 30 through a buffer and driver 91 through connector 27B to the actuator output board 21B.

A zero crossing signal is coupled from the actuator output board 21B through connector 27B and through a zero crossing detector 93 of suitable known design to microprocessor 30 (see the line labeled interrupt 1 in FIG. 2). Port 4 of microprocessor 30 also receives a line level input, through a divider 97, from an unregulated voltage signal from board 21B. A high voltage reference source 101 and a low voltage reference source 103, both coupled to secondaries of transformer 121, comprise high and low voltage sources for microprocessor 30. A regulator 105 provides a regulated D.C. voltage for control board 21A.

The actuator output board 21B includes SCRs 107 and 109 of suitable known design. SCR 107 is coupled to a gate driver 111, a filter 115 and an opto-isolator 117 and connected through connector 27B to the SCR drive signal from driver 91 and microprocessor 30. SCR 109 includes similar drive circuits, which are shown but not numbered, which are coupled in parallel to the drive circuit of SCR 107.

A voltage transformer 121 has its primary winding connected through control taps 123 to mother board 31 to connect to an A.C. source to selectively provide 120V, 208V, 240V, and 277V across the primary. THe transformer includes three secondary windings 125, 127, and 129. Secondary winding 125 is connected to provide an isolated power drive to SCR 107 and secondary winding 127 is connected to provide an isolated power drive to SCR 109, as indicated in FIG. 2. Secondary winding 129 is connected across a rectifier 131 to provide a rectified voltage through connector 27B to board 21A which is utilized to provide a zero crossing reference signal, as will be explained. Secondary winding 129 also connects to a second rectifier and filter circuit 133 which provides an unregulated D.C. voltage to microprocessor 30.

Refer now also to connector 27C and mother board 31. The mother board 31 includes a bus 135 input including analog control input line (ACI), a light sensor input line (LSI), and a switch input line (SWI). The mother board 31 also includes a by-pass switch circuit 137 which by-passes the actuator control module 21 without affecting the other control modules in the system. Mother board 31 also includes a manually programmable address switch 128.

Figure 3:
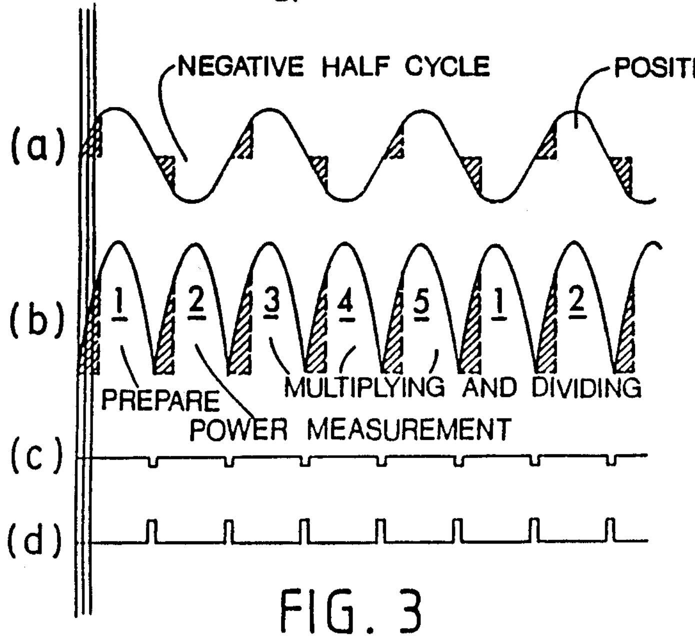
Figure 3E:
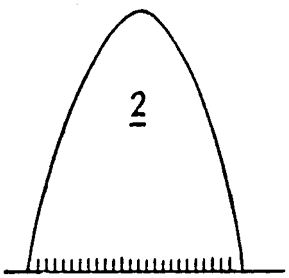

Various sub-systems of the actuator module 21 will now be described with reference to FIG. 2 as well as to FIG. 3. As indicated in FIG. 2 input A.C. power is coupled through transformer 121 and secondary winding 129 to a rectifier 131. It is known that the A.C. power provided by the public service is frequency stable and this feature is utilized to provide a time reference point. The voltage provided by secondary winding 129 is a sine wave as shown in FIG. 3(*a*). The voltage is amplified and rectified by rectifier 131 to provide a waveform as in FIG. 3(*b*). The zero crossing detector 93 detects the zero cross over point as indicated in FIG. 3(*c*) and amplifies and clips the signal as shown in FIG. 3(*d*). This signal indicated in FIG. 3(*d*) is coupled to microprocessor 30 to function as a reference point for processing the input signals.

The current transformer 130 in actuator output board 130 senses the actual current in the line feeding the lamp circuit load. The signal provided by current transformer 130 is coupled through a precision resistor and amplifier circuit 97A as the current signal to microprocessor 30.

A lamp sensing signal is developed across the precision resistor 67A comprising a lamp sensor 67. Resistor 67A is connected from a D.C. source to line 59 and the LSI (Light Sensor Input).

In the embodiment shown the lamp sensor 67 will accept a light level from 5 to 500 foot candles. The lamp sensor resistor 67A will develop a voltage drop across it which linear in proportion to the light level to which the sensor 67A is exposed.

The terminal marked LSI is connected through the filter and transient suppresion network 41 to the input of the analog to digital (A/D) converter section 30A of a microprocessor 30. The microprocessor 30 controls the power in the light load circuit based on the value that is detected at the A/D input section 30A.

The low or dark output of sensor 67 is a given voltage, and the sensor is adjusted to develop a selected volts output at the desired light level. The value of selected volts output is the value that provides a reference that the desired level of light has been attained. Should this value decrease, the microprocessor 30 will increase the power in the light load until the selected volt value is detected; or until the maximum power in the light load has been reached. Should the value go higher than selected volts the microprocessor 30 will decrease the power in the load until selected volt value is attained, or until the minimum power set by the saving switch is reached.

Some filtering is done in the lamp sensor 67. Moreover, hysteresis is generated by the ramp up/down operation, to be explained, and this is enough to filter out the normal effect of large quick changes in light level, yet it is fast enough to sense and acknowledge the ramping level so as to minimize over-shoot.

Referring to FIG. 2 the actuator module control board 21A obtains a relative indication of power drawn by the light fixtures through current sense line 94.. As is known, the 60 Hz sine wave frequency of the power systems is very stable. Microprocessor 30 of actuator module 21 ulitlizes this feature as one factor to provide a power calculation.

The voltage signal is coupled to actuator module 21 and detector 93 through transformer 121 and rectifier 131.

The voltage zero crossing point provided at dectector 93 serves as a reference point for initiating a power measurement sequence and for activating the SCRs 107 and 109, as will be explained. The microprocessor 30 provides a power evaluation sequence which comprises a series of measurements and computations done in five half cycles (see FIGS. 3*a*–3*d*) as follows:

| TIME | FUNCTION |
|---|---|
| 1st Sequence | |
| 1st Half Cycle | Prepare (Ready) Cycle |
| 2nd Half Cycle | Power Cycle. Take measurements of instantaneous current (twenty-nine times in one embodiment). |
| 3rd Half Cycle<br>4th Half Cycle<br>5th Half Cycle | Multiplying and dividing function to provide a relative power number. |
| 2nd Sequence | |
| Repeat 1st Sequence in next five half cycles. | |
| Nth Sequence | |

-continued

| TIME | FUNCTION |
|---|---|
| Continuous Sequence | |

The sequence is continuously repeated as long as the unit operates.

Every other power evaluation sequence or until an error happens such as DC detection or overload, and hence the instantaneous current measurement, will be on opposite polarity half cycles. Compare the sketch of FIGS. 3(*a*) and 3(*b*), wherein the half cycle number 2 which is the power measurement or power evaluation cycle shows the half cycle power measurement occurring on half cycles of opposite polarity.

After a repetition of a number of sequences, the microprocessor 30 provides an average relative power number. The relative power number obtained is compared with the setting of the power saving dip switch or control (0–10V or 4–20 ma signal, or the lamp sensor) input and the microprocessor 30 then effects a flag which activates a Ramp-UP or Ramp-Down of the power level. However, the Ramp-Up or Ramp-Down command is not executed until the ramp timer ON period which is set for timing of the ramping function every 2 to 8 seconds, that is 120 to 480 cycles. The ramp timer in microprocessor 30 initiates a time period based on the time the SCRs are turned ON in each half cycle and is activated to produce a linear change in power level and hence of the light level over a period of time.

Microprocessor 30 incorporates a ramp time table to effect linearization of the change in power level so that changes in light levels are not noticed by the user. The ramp time table provides charts of time versus power level changes in decreasing increments, and can be used to effect an interpolation of voltage change as follows:

Since the power savings level is preset, it is a known factor and the average relative power level is also a known (measured) factor. Accordingly, since the preset and the desired levels are known, a reference or look-up of the ramp time table provides an approximate number of equal step changes required to get from a given level to the desired level. The ramp speed or the rate change is based on the amount that the power level must be changed; and this change is the distance from the average relative power level to the desired power level (See FIG. 6). Importantly, the ramp speed is controlled so that the user notices no change. The steps are as follows:

1. The average relative power is known (point X).
2. The pre-set level is known (point Y).
3. The amount of change required is known (distance from point X to point Y).
4. The power level at point Y is subtracted from the power level at point X (X-Y).
5. The result is an amount of change distance, in terms of minimum steps required to make the changes.
6. The distance number is applied to the table.
7. A step rate is obtained from the table.
8. The step rate varies, for example: ½seconds to 8 seconds.
9. At the 8 second rate, the power level will not change for 8 seconds based on that reading.
10. Further, the step rate is calculated every five half cycles due to the fact that the power is recalculated every 5 half cycles.

11. Each new reading is entered into as a factor in the average relative power number; and,
12. The old reading is discarded.

The principal purpose of ramping is to change the power level smoothly and hence to change the light level unnoticeably. However, the minimum step of transition may cause noticeable changes, and also a problem is posed because the function half cycle is non-liner and includes various unique criteria, as will be explained, and this non-linear function is to be controlled responsive to a linear time parameter. Accordingly, special techniques have been developed so tht the ramp timer provides a near linear change in light over time.

As follows, a ramp speed is selectively based on the amount or distance in steps that the power level must be changed to attain the desired power level.

As an illustrative example assumes the dip switches are set for a 40% savings of the full (100%) power level. The simple relation, 100–40 =60% gives a power level required; and therefore a 40% power savings. The steps to effect a smooth unnoticeable change are as follows:

A. Use the ramp table to calculate a position. A decision whether to step or not to step is made as the result of the calculation. A step is the minimum change in power level possible. Hence, the ramp table is used to calculate if a a step can be taken to effect a non-noticeable power reduction.
B. Execute the power change steps as described above.
C. (Assume) In the next measurement calculation the power level is 90% of the full power.
D. Use the ramp table to calculate a minimum number of steps necessary to effect a non-noticeable change from 90% to 40%.
E. Execute some power change steps at new rate.
F. (Assume) In the next measurement calculation the power level is 80% of the full power.
G. Repeat step D.
H. Repeat step E.

In operation, the lighting fixtures to be controlled are provided a warm up period to assure that ballast, filaments, etc. are at stable and normal operating condition. As will be explained, the warm up period is selectable. At the end of warmup period a full power measurement is made. When the warm up period has terminated, actuator module 21 control is initiated. A dip switch is preset in module 21 for the percentage of savings from the full power measurement desired, for that particular application, for example, 50% of full power. That is, the desired power level is "tuned" to the particular application.

The power level measurement sequence is initiated at the end of the warm up period. As stated above, the current is sensed and measured to obtain a number which is multiplied by the voltage factor stored in ROM and averaged to obtain a number corresponding to relative power. This relative power number is compared to the preselected power level desired. If the relative power number is too high the circuit delays turning an SCR's ON by the preset time period; that is, later in time. If the relative power number is too low the SCRs will be turned ON sooner. A second measurement of the current is next made some microsecond interval later. Dependent on the relative power number obtained from the second measurement the SCRs will be turned ON, sooner or later. The SCRs are turned OFF at the zero current point automatically as a function of its structure. A decision is thus made at each time interval to determine at what point to turn ON the SCRs.

Figure 4:
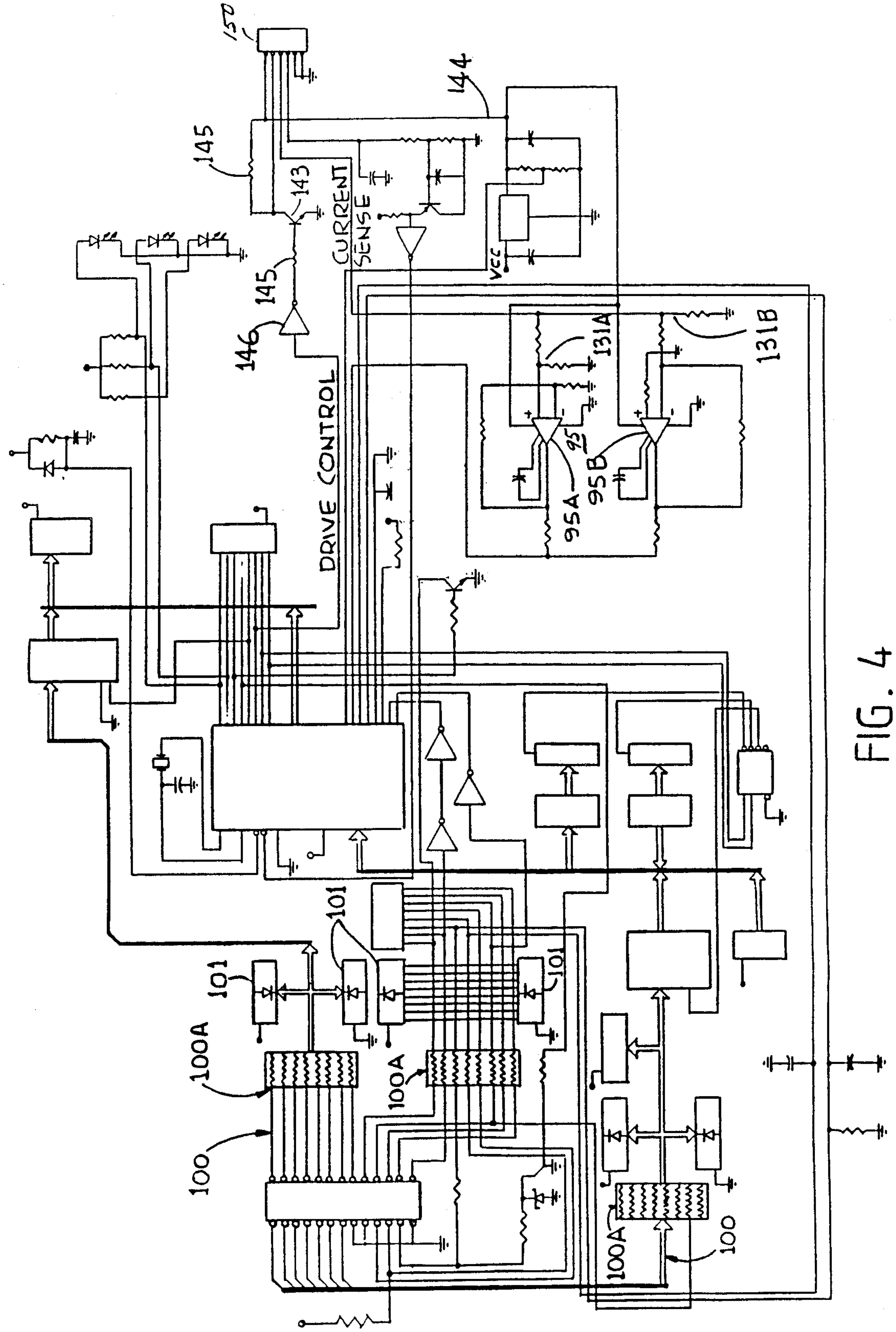
FIG. 4 is a schematic diagram of the actuator control board.

The SCR control circuit shown in actuator control board 21A of actuator module 21 (See FIG. 2) drives parallel connected SCRs 107 and 109 as also indicated in FIG. 4. As is well known in the art, in a circuit such as shown in FIG. 4, the average power in the circuit can be controlled by controlling the turn ON time of the SCR. The microprocessor 30 provides the command signals to control the drive pulse to the SCR 107 and 109 and thus the power flow to the lighting fixtures. Because the process of calculating the power is calculation intensive and hence time consuming, the power sensing and calculation is performed over a multiple cycle time period as indicated in FIG. 3.

Figure 6:
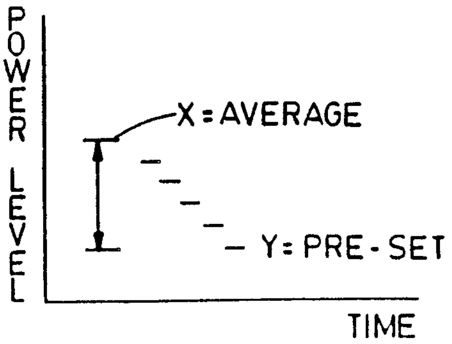
FIG. 6 is a graph useful in explaining the power level change effected by the invention.

Importantly, the control of the time for the turn-ON of the SCR during a half cycle period is effected as indicated in FIG. 3. The graph of FIG. 3A is self-explanatory showing that in the shaded area of the half cycle sine wave there is little measurement difference in power when an SCR is turned ON. If an SCR is turned ON in this area or time of the cycle there will be a power increase up to the point on certain types of loads. FIG. 6 indicates the minimum steps T in time for controlling the ON-OFF times of the SCRs.

As mentioned, the actuator module 21 operates at differing power savings levels selected by saving level switches 32 comprising a multiple position dip switch on the actuator control module 21. The saving levels are selectively set for the desired amount of savings by the lamp sensor input, the 0–10 V input, the 4–20 ma analog input, or by remote computer control if selected. If the light level is reduced to an unacceptable level, the savings level can be changed to a lesser savings; and thus to more light.

Module 21 provides an adjustable 12 sec to 12 min delay before beginning to slowly ramp down to the power savings level. A function switch 31 comprises a multiple position DIP switch sets the warm up time for 12 sec, 1 min, 5 min and 12 minute increments. This delay allows different types of ballast/lamp combinations of different types of fluorescent lamp and ballast and HID lamps and ballast to reach the proper operating temperature.

After the preset delay module 21 ramps down to the savings level as set by the saving level dip switch 32, the module 21 will lower the power level in steps until the selected power level is reached. The timed length of each step is variable from ½ to 8 seconds. This is an unnoticeable transition which allows the eye to compensate for the reduction in light output.

The savings level switch SW1 comprises a conventional multiple position dip switch. The programmed setting for switch SW1 in the embodiment shown is an eight position dip switch utilizing five of the eight positions wherein a conventional manner, for example:

| Position: | 4 | 5 | 6 | 7 | 8 |
|---|---|---|---|---|---|
| Savings Level: | 2% | 5% | 10% | 20% | 40% |

Thus if switch position 4 is ON, a 2% level saving is programmed; if switch position 5 is ON, a 5% level saving is programmed, etc. Consequently, a selected combination of switch settings provides a desired saving level.

Switch labeled SW1 is a conventional function control switch.

The status of the program operation (basic sanity indicator) is indicated by the module indicator lights 81. When an actuator module 21 is installed the indicator light 81 (light emitting diode) will flash ON and OFF at a one second rate. Light 83 will be OFF during the warm up period light 83 will be blinking during ramp down and light B will be ON, steady, when the selected saving level is reached. A light diode 103 will be OFF if there is no power to the actuator, and Light C will be ON if there is power to the actuator.

An offset measurement is made when there is no current flowing in the load. The microprocessor makes measurements when there is no current (SCRs are off). Since there should be zero current when the SCRs are OFF, in effect, the microprocessor measures the offset error when there is not supposed to be any current. The absolute value of any error measured when the SCRs are OFF is stored in RAM and used to power calculations to provide offset compensation.

Refer to FIG. 4, every input line, generally labeled as 100, includes a resistor 100A (in the embodiment shown the resistor is 1K ohms resistor) is connected with a reverse biased diode 101 to DC source (VCC) and common. Any incoming transient is thus current limited by the resistor and regardless of the incoming polarity one of the diodes will conduct as soon as the voltage at the terminal goes above VCC, or goes below common. When the diode conducts it will take the transient (noise) and dump it into the system power supply. The system power supply is protected by a zener diode, and as soon as voltage rise above the zener voltage it will conduct dissipating transient into heat energy.

Referring still to FIG. 4, absolute value amplifier 95 comprises two operational amplifiers 95A and 95B. A signal from the current sensor is applied through voltage divider 131A to the noninverting input terminal of amplifier 95A. The same signal is applied to the inverting terminal amplifier 95B through nearly an identical voltage divider 131B. The gain of each of the amplifiers 95A and 95B is nearly identical. The loads are also nearly identical.

If the incoming signal is positive, amplifier 95A will produce a positive output proportional to the input times the gain of amplifier 95A. A positive input voltage to amplifier 95B will cause amplifier 95B to swing to zero volts. The outputs of amplifiers 95A and 95B will be summed and applied to the A/D section 30A of microprocessor 30.

Likewise, if the incoming signal is negative, amplifier 95B will produce a positive inverted output proportional to the input times the gain of amplifier 95B. A negative input voltage to amplifier 95A will cause amplifier 95A to swing to zero volts. Again the outputs of amplifiers 95A and 95B will be summed and applied to the A/D section 30A of microprocessor 30. Accordingly, amplifier 95 provides an amplified absolute value proportional to the current in the load.

Figure 5:
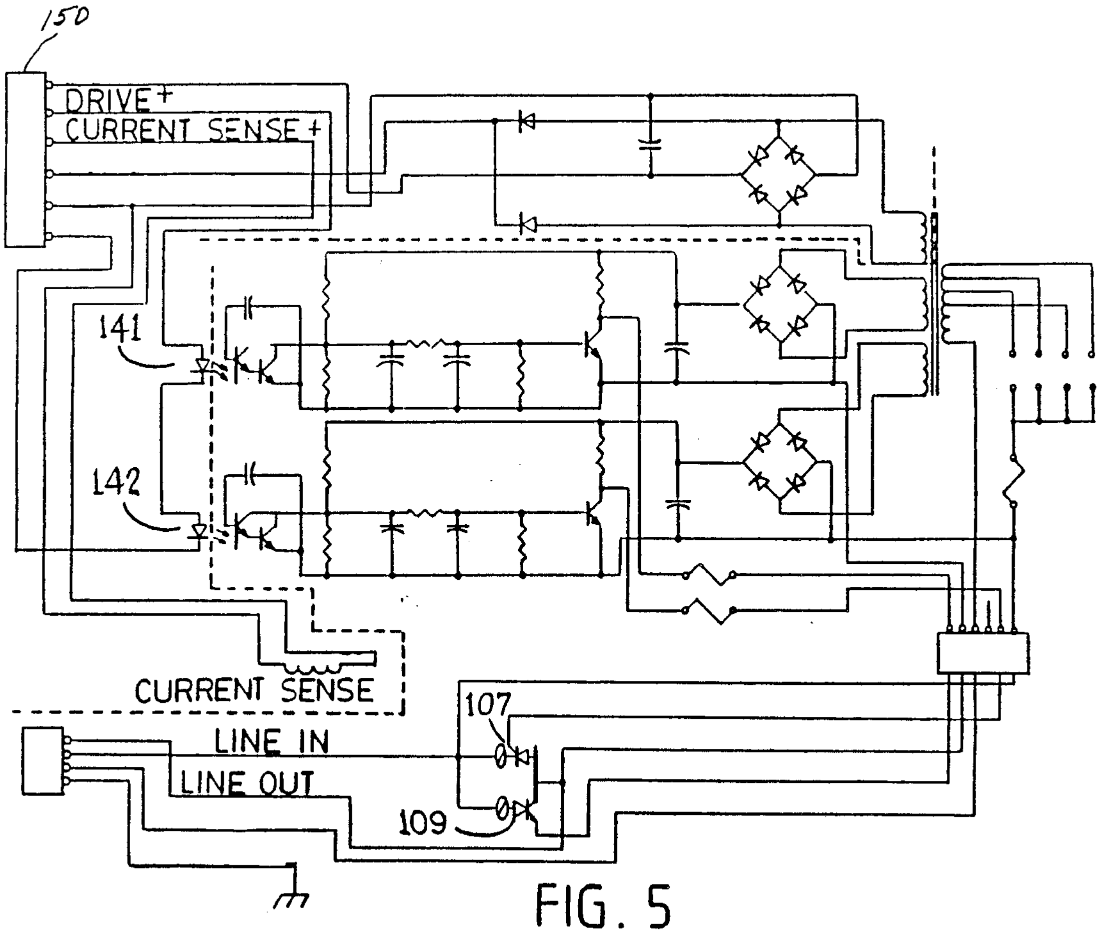
FIG. 5 is a schematic diagram of the actuator output module, and FIG. 5(*a*) is a sketch useful in explaining the diagram of FIG. 5.
Figure 5A:
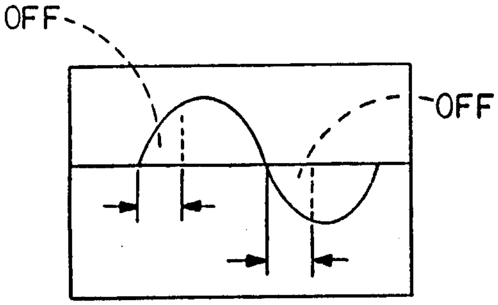

Refer now to FIGS. 4 and 5. The circuit of FIG. 4 also provides a switching concept wherein the current is steered to provide a switching operation. In FIG. 5 (Vcc) voltage is coupled to the actuator output board and two opto isolators diode 141 and 142. It is necessary to switch the opto isolator diodes ON and OFF in what might be termed a "soft" or "steered" switching. Accordingly, the circuit provides a transistor 143 control for switching operation. In FIG. 4 current is coupled from D.C. voltage (Vcc) through lead 144 and resistor 145 to the collector of PNP transistor 143. The emitter of transistor 143 is connected to ground, and the base of the transmitter is connected through a resistor 145 and operational amplifier 146 to source drive control signal 147. The collector of transistor 143 connects through connector 150 through lead 148 and connector 149 to opto isolator diodes 141 and 142 (See FIGS. 4 and 5). When opto isolator diodes 141 and 142 are to turn ON, i.e., to have current flow therethrough, the drive signal turns transistor 143 OFF causing current to flow in the opto isolator diodes 141 and 142. To switch the diodes 141 and 142 OFF, the transistor 143 is turned ON to steer the current to ground, away from the diodes 141 and 142.

An important advantage of this "steered" or "soft" switching is that the current flow is continuous and there are no surges in the supply which may stress components or which may induce voltages in adjacent leads or components.

The circuit of FIG. 5 assures that no D.C. current is allowed to flow into the load in case one of the SCRs 107 or 109 fails. If a current is sensed when there should be no current, such as in the area indicated "OFF" in FIG. **5*a*, both SCRs 107 and 109 are turned ON to assure that an A.C. input is coupled to the load. In this case the power to the load would no longer be controlled by the inventive module 21**, and the load would be subject to its normal or full input.

Also note, that if one of the SCRs 107 or 109 shorts, the resistance across the two SCRs (which are connected in parallel) results in the maximum voltage across the SCRs being approximately 1.5 volts, hence this condition will not damage the load.

While the invention has been particularly shown and described with reference to a preferred embodiment thereof, it will be understood by those skilled in the art that various changes in form and details may be made therein without departing from the spirit and scope of the invention.

I claim:

1. A control module for controlling the power provided to a lighting fixture load from an alternating current source comprising in combination, (a) means for determining a first power level regardless of the phase angle between the voltage and current that has to be applied to the connected lighting fixture load to provide a given lighting level, (b) said mean for determining said first power level including, (c) means for sensing at spaced periodic points the instantaneous current flowing to said lighting fixture load, said periodic points being related to a reference half cycle of a voltage sine wave and (d) means for multiplying said instantaneous current by a factor representing an instantaneous voltage factor at the current sensing point to provide an instantaneous power resultant, (e) means for selecting a second power level which is a percentage of said first power level which will be provided to said lighting fixture load to effect a selected lighting level which is less than said given lighting level, and (f) means for controlling said second power level provided to said lighting fixture load in accordance with said selected lighting level, said means for controlling said second power level means including (g) means for combining and averaging a selected number of resultants to obtain a factor representing the average of said second power level provided to the lighting fixture load.

2. A control module for controlling the power provided to a lighting fixture load from an alternating current source comprising in combination, (a) means for determining a first power level regardless of the phase angle between the voltage and current that has to be applied to the connected lighting fixture load to provide a given lighting level, (b) means for selecting a second power level which is a percentage of said first power level which will be provided to said lighting fixture load to effect a selected lighting level which is less than said given lighting level, and (c) means for controlling said second power level provided to said lighting fixture load in accordance with the selected lighting level, said means for determining said first power level including (d) means for multiplying instantaneous current and voltage to effectively reduce the factor of the phase angle between the alternating current and voltage to reduce the effect of inductive reactance to enable determining the real power used by the lighting fixture load (e) whereby said module is connectable in series for selectively controlling fluorescent lighting loads as well as high intensity lighting loads and incandescent loads.

3. A control module for controlling the power provided to a lighting fixture load from an alternating current (AC) source comprising in combination (a) means for determining a first power level regardless of phase angle between the voltage and current that has to be applied to the connected lighting fixture load to provide a given lighting level, (b) means for selecting a second power level which is a percentage of said first power level which will be provided to said lighting fixture load to effect a selected lighting level which is less than said given lighting level, (c) means for controlling said second power level provided to said lighting fixture load in accordance with said selected lighting level, (d) current turn ON means, and (e) said controlling means including means for deriving a time dependent load power pulse which extends substantially for the full time of the periodic half cycle AC voltage zero crossing, said extended load power pulse insuring that early or false zero crossings in a half cycle that would cause said current turn ON means to turn OFF are sensed by said controlling means and said controlling means immediately retriggers said current turn ON means in the same half cycle to thereby minimize the production of large voltage spikes caused by residual magnetic energy dissipating in the load after early turn off, (f) whereby the system can be utilized with fluorescent lighting fixture loads as well as with high intensity discharge lighting fixture loads.

4. A control module as in claim 1 wherein said means for controlling said second power level to said lighting fixture load includes, (a) at least two SCR devices connected in parallel with each other and in relative reverse polarity orientation, (b) means to control the turn ON of the SCR devices at selected points of alternating current sine waves, (c) means for detecting the conducting level of each of said devices and the symmetry in conducting level thereof, (d) means for detecting failure of any SCR device, and (e) said turn ON control means turning all said SCR devices to their respective full conducting condition in response to said failure detecting means.

* * * * *